United States Patent [19]

Lu et al.

[11] Patent Number: 5,450,317
[45] Date of Patent: Sep. 12, 1995

[54] METHOD AND SYSTEM FOR OPTIMIZED LOGISTICS PLANNING

[75] Inventors: Lu Lu, Boulder; Yuping Qiu, Louisville; Louis A. Cox, Jr., Denver, all of Colo.

[73] Assignee: U S WEST Advanced Technologies, Inc., Boulder, Colo.

[21] Appl. No.: 158,128

[22] Filed: Nov. 24, 1993

[51] Int. Cl.$^6$ ............... G06F 15/20; G06G 7/418
[52] U.S. Cl. ................... 364/402; 364/401
[58] Field of Search ........... 364/401, 402, 468, 403, 364/408

[56] References Cited

U.S. PATENT DOCUMENTS

| | | | |
|---|---|---|---|
| 4,646,238 | 2/1987 | Carlson, Jr. et al. | 364/403 |
| 4,887,207 | 12/1989 | Natarajan | 364/401 |
| 5,068,797 | 11/1991 | Sansone et al. | 364/478 |
| 5,072,401 | 12/1991 | Sansone et al. | 364/478 |
| 5,101,352 | 3/1992 | Rembert | 364/401 |
| 5,193,065 | 3/1993 | Guerindon et al. | 364/468 |
| 5,216,593 | 6/1993 | Dietrich et al. | 364/402 |
| 5,224,034 | 6/1993 | Katz et al. | 364/401 |

OTHER PUBLICATIONS

Hadley, G. et al., "Analysis of Inventory Systems," pp. 1-26 and 420-423.
Buffa, Elwood G., et al., "Production-inventory Sytems Planning and Control", 1972, pp. 67-79; pp. 114-135.
Plossl, George, "Orlicky's Material Requirements Planning," pp. 14-66 AMMS-Advanced Material Management System-Training Documentation.

*Primary Examiner*—Gail O. Hayes
*Assistant Examiner*—Stephen R. Tkacs
*Attorney, Agent, or Firm*—Brooks and Kushman

[57] ABSTRACT

An improved logistics planning method and system for recommending optimal order quantities and timing, choice of vendor locations and storage locations, and transportation modes, for individual items and for product families. The system is designed for use in cooperation with the computer having memory and incorporates item, customer, supplier, and routing information databases. In operation, the item, customer and supplier databases are accessed in order to provide customer and warehouse demand forecasts. The routing and customer databases are similarly accessed to provide transportation cost forecasts necessary to determine optimized routing modes for selected items, customers and suppliers. The demand and transportation costs are processed in accordance with a dynamic programming model to determine stock and non-stock order/shipment solutions for the selected items and customers, including optimized supplier and routing selection, order timing and quantity.

5 Claims, 5 Drawing Sheets

METHOD AND SYSTEM FOR OPTIMIZED LOGISTICS PLANNING

TECHNICAL FIELD

The present invention relates generally to resource allocation systems and, more particularly, to an Optimized Logistics Planning Tool (OLPT) developed for use in cooperation with a computer having memory to recommend global optimized order quantities and schedules, vendor and storage locations, and transportation options.

BACKGROUND ART

In today's increasingly competitive world market, the problem of allocating and maintaining available resources to, for example, manufacture or distribute selected products or items, has become the focus of considerable attention. The problem does not admit of simple solutions since there are typically many variables and often many potential solutions, a number of which may appear to be equally viable. On the manufacturing side, project management techniques assume that decisions have been made regarding resource allocation. For those industries where there is surplus capacity, decisions involved in resource allocation are relatively easy, but surplus capacity is a rare commodity in today's market-driven economies.

A number of books and articles have been published which address the issue of inventory costs, notably The Industry References Production-Inventory Systems, Planning and Control by Elwood S. Buffa, published by Richard D. Irwin, Inc. and Analysis of Inventory Systems by G. Hadley and T. M. Whitin, published by Prentiss-Howell International, Inc. See also, Material Requirements Planning by Joseph Orlicky, published by McGraw-Hill. Material Requirements Planning (MRP) is a system for translating demand for final products into raw material requirements. MRP is thus essentially an information system and a simulation tool designed to generate proposals for production schedules which managers can evaluate in terms of their feasibility and cost effectiveness. MRP does not, however, address optimization issues. An example of an MRP system is IBM's Computer Program Product, COPICS, which is currently in use in many manufacturing facilities.

There are presently a number of other existing logistics planning tools designed for use by inventory control personnel to select vendors, warehouse locations and transportation means and routes. For example, the computer-based Procurement Decision Support System (PDSS) developed by Bell Communications Research Corporation (Bellcore) has been used to reduce the costs of purchasing selected items on a large scale basis. As those skilled in the art will recognize, the PDSS system has been generally implemented in cooperation with a similar computer-based demand forecasting tool such as the Advanced Material Management System (AMMS) developed by American Software. The PDSS tool and those available like it have been found to be highly useful in recommending least-cost vendors for specific items or groups of items and in calculating order quantities to take advantage of business volume discounts. These systems do not, however, minimize the total costs of introducing items into ordering, storage and distribution systems.

Other known logistics planning tools have similarly been implemented by inventory managers yet fail to address the optimization issues solved by the present invention. See, for example, U.S. Pat. No. 5,216,593 issued to Dietrich et al. and assigned to International Business Machines Corporation. The '593 patent, entitled "Method and Apparatus for Discrete Activity Resource Allocation Through Cardinality Constrained Generation" is directed broadly to a computer implemented procedure for solving a Discrete Activity Resource Allocation (DARA) problem. More specifically, the '593 patent is directed to a logistics planning tool for collecting and assessing inventory and order data, generating and evaluating a production plan, and controlling execution of the plan through the interim generation of "cliques and covers."

U.S. Pat. No. 4,887,207 issued to Natarajan and also assigned to International Business Machines Corporation is similarly directed to an automated system for evaluating the sensitivity of inventory costs due to fluctuations in customer demand. More specifically, the '207 patent discloses a method and system for calculating work-in-process inventory costs which are required to manufacture selected products.

U.S. Pat. No. 4,646,238 issued to Carlson, Jr. et al. and assigned to Analog Devices, Inc. is directed to a material requirements planning system and procedures for use in process industries. The '238 patent is specifically directed to a system for controlling the flow of semiconductor products and their components through a production facility including assembly and final testing of a large number of different products with multiple product grades. As disclosed, the patent of the '238 system stores information on the demand and inventory of all product grades together with grade distribution data to provide the yield of all co-products of a product family from testing the common component of that family.

U.S. Pat. No. 5,101,352 issued to Rembert and assigned to Carolina Cipher is directed to a material requirements planning system. The '352 patent discloses an integrated MRP system for distributors, manufacturer and job shops. As disclosed, the '352 patent permits the user to define items which uniquely characterize the product for a customer order, purchase order or work order. The disclosed invention further permits the application of user-defined formulas which determine the quantity and/or size of a selected manufacturing part based on the selected options.

Finally, U.S. Pat. No. 5,193,065 issued to Guerindon et al. and assigned to Caterpillar, Inc. is directed to a system for requisitioning and distributing material in a manufacturing environment.

The total cost of an item as calculated by inventory control personnel is not just the unit purchasing cost, but rather, the sum of this as well as transportation costs (from the vendor to a selected company warehouse and from the warehouse to point of use), storage and inventory costs, ordering costs (e.g. for the time of contracting and purchasing agents), support, maintenance and repair costs, picking costs (in which items received in containers of one size must be picked out and repackaged for final distribution), and so on. Without addressing these additional costs, inventory control efforts have heretofore been decentralized. For example, a warehouse manager may order items in quantities that minimize the warehouse costs, even though this may increase the downstream picking and repackaging costs at a local distribution center. To properly account for all of the total costs involved in purchasing, shipping and storage, it would thus be desirable to have available a purchasing decision support system that will recommend globally optimal order quantities and schedules, vendor and storage locations, and transportation options so as to minimize the total costs to the user and facilitate improved inventory control strategies.

DISCLOSURE OF THE INVENTION

It is therefore a principal object of the present invention to provide an improved logistics planning method and system to recommend optimal order quantities and timing, choice of vendor locations and storage locations, and transportation mode, both for individual items and for product families.

It is yet another object of the present invention to provide a method and system for optimized logistics planning which may be easily interfaced with the Bellcore Procurement Decision Support System (PDSS) as well as suitable demand forecasting means such as the Advanced Material Management System (AMMS) and the Integrated Transportation Logistics System (INT-RLOG) developed by American Software and Tadmis Worldwide, respectively.

Yet another object of the present invention is to provide an improved method and system for logistics planning which is capable of providing stock and nonstock order/shipment solutions for selected items and customers, including optimized supplier and routing selection, order timing and quantity.

Still further, another object of the present invention is to provide a method and system for optimized logistic planning which makes use of dynamic programming procedures and, in particular, warehouse demand and customer demand matrices to determine interim demand solutions.

In realizing the aforementioned and other objects, the system of the present invention is designed for use in cooperation with a computer having memory. The system comprises an item information database, a customer information database, a supplier information database and a routing information database. Demand forecasting means is provided for accessing the item, customer and supplier databases and determining warehouse and customer demand forecasts for selected items, customers and warehouses at selected intervals. Transportation forecasting means is further provided for accessing the routing and customer databases and determining optimized routing modes for selected items, customers and suppliers. Finally, data processing means responsive to the demand forecasting means and the transportation forecasting means is provided for determining stock and non-stock order/shipment solutions for the selected items and customers, including optimized supplier and routing selection, order timing and quantity.

In operation, item, customer, supplier and routing information databases are provided in electrical communication with the computer memory. The item, customer and supplier databases are thereafter accessed in order to determine warehouse and customer demand forecasts for selected items, customers and warehouses at selected intervals. In the preferred embodiment further described herein, the step of determining the warehouse and customer demand forecasts further include determining total demand of the ith warehouse ($D_i$) in the jth month as well as determination of the demand of the kth customer of the ith warehouse in the jth month $\bar{d}_{ij}^k$ in accordance with the mathematical models:

$$d_{ij} = \text{MAX}\left\{ 0, \frac{D_i * a_{ij} * (1 + j^* t_i)}{1200} \right\},$$

$i = 1, 2, \ldots W$
$j = 1, 2, \ldots 12$ $d_{ij}^k = \bar{P}_i^k * d_{ij}$, $k = 1, 2, \ldots, C_i$; $i = 1, 2, \ldots, W$ and $j = 1, 2, \ldots, 12$.

where,
W = the number of warehouses,
$D_i$ = the total demand of the ith warehouse in the next 12 months,
$t_i$ = the trend component,
$C_i$ = the number of customers of the ith warehouse, $i = 1, 2, \ldots, W$,
$\bar{P}_i^k$ = the customer demand forecast percentage for the kth customer of the ith warehouse, and
$a_{ij}$ = the demand index of the ith warehouse.

Following determination of the warehouse and customer demand forecasts, the routing and customer databases are accessed in order to determine optimized routing modes for selected items, customers and suppliers. Once provided this information, stock and nonstock orders/shipment solutions may be determined for selected items and customers, including optimized supplier and routing selection, order timing and quantity. In the preferred embodiment, this latter step is accomplished in accordance with the dynamic programming model:

$$f(p) = \text{MIN}\left\{ f(j) + M_p(Q) + I_p(Q) + T(Q) | Q = \sum_{k=p}^{j-1} d_{k,j} = p + 1, p + 2, \ldots 13 \right\}$$

$$g(p) = j^*$$

where f(p) is the total cost function for the order quantity Q at the pth month and g(p) is the optimized order point;
where, $j^*$ is the index that minimizes the equation; and
Q = order quantity at the pth month;
$M_p(Q)$ = material cost;
$I_p(Q)$ = inventory cost; and
$T(Q)$ = transportation cost.

The above objects and other objects, features, and advantages of the present invention are readily apparent from the following detailed description of the best modes for carrying out the invention when taken in connection with the accompanying drawings:

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODES FOR CARRYING OUT THE INVENTION

While the invention will now be described in connection with a preferred embodiment (procedure), it will be understood that the following description is not intended to limit the invention to that embodiment (procedure). On the contrary, it is intended to cover all alternatives, modifications and equivalents as may be included within the spirit and scope of the invention as defined by the appended claims.

Figure 1:
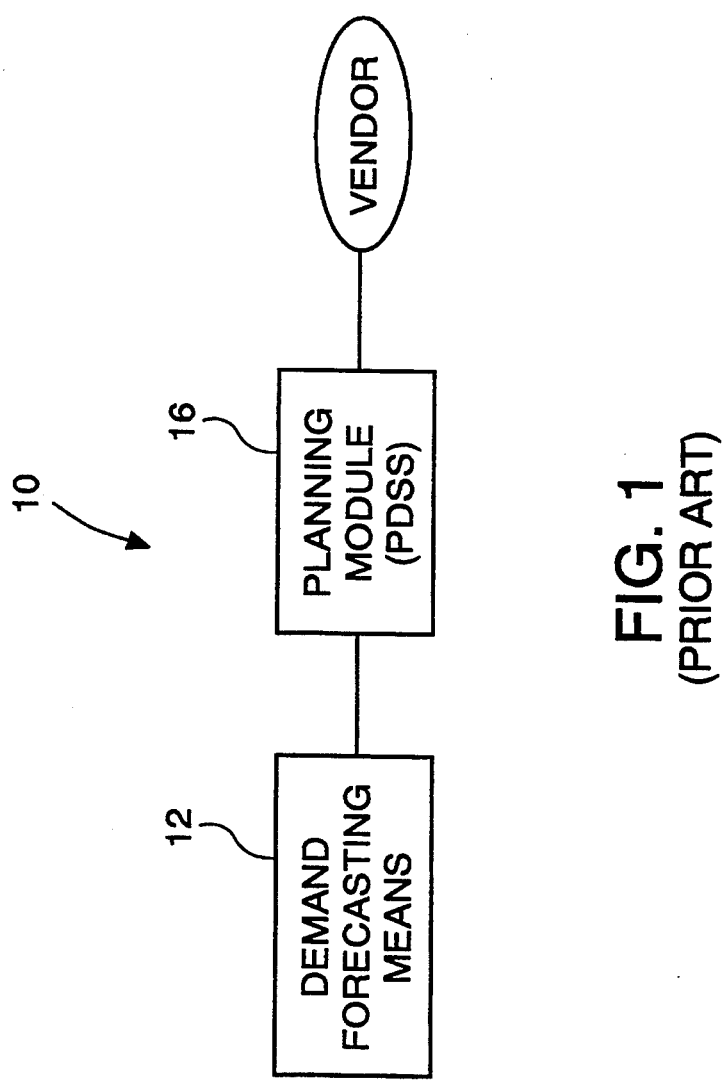
FIG. 1 is a generalized block diagram of a prior art logistics planning tool.

Turning to FIG. 1, there is shown a block diagram of a prior art logistics planning tool which has been implemented by those skilled in the art for recommending least-cost vendors for specific items or groups of items and in calculating order quantities to take advantage of business volume discounts. The prior art planning tool which is designated generally by reference numeral 10 includes the use of demand forecasting means 12 such as the Advanced Materials Management System (AMMS) developed by American Software. In this prior art system, once the demand forecast has been determined, this information has heretofore been communicated to a planning module 16 such as the Procurement Decision Support System (PDSS) developed by Bell Communications Research Corporation (Bellcore).

As indicated above, while the prior art system, and in particular the Procurement Decision Support System 16, has been found highly useful in recommending least-cost vendors for specific items or groups of items, etc., it is incapable of minimizing the total costs of an item. More specifically, the prior art systems of the type shown in FIG. 1 are incapable of accounting for transportation costs (from the vendor to a selected warehouse and from the warehouse to point of use), storage and inventory carrying costs, ordering costs (e.g., for the time of contracting and purchasing agents), support, maintenance and repair costs, picking costs (in which items received in containers of one size must be picked out and repackaged for final distribution) as well as other known costs.

The prior art systems have thus provided decentralized cost containment and have proven incapable of recommending globally optimal order quantities and schedules, vendor and storage locations and transportation options.

Figure 2:
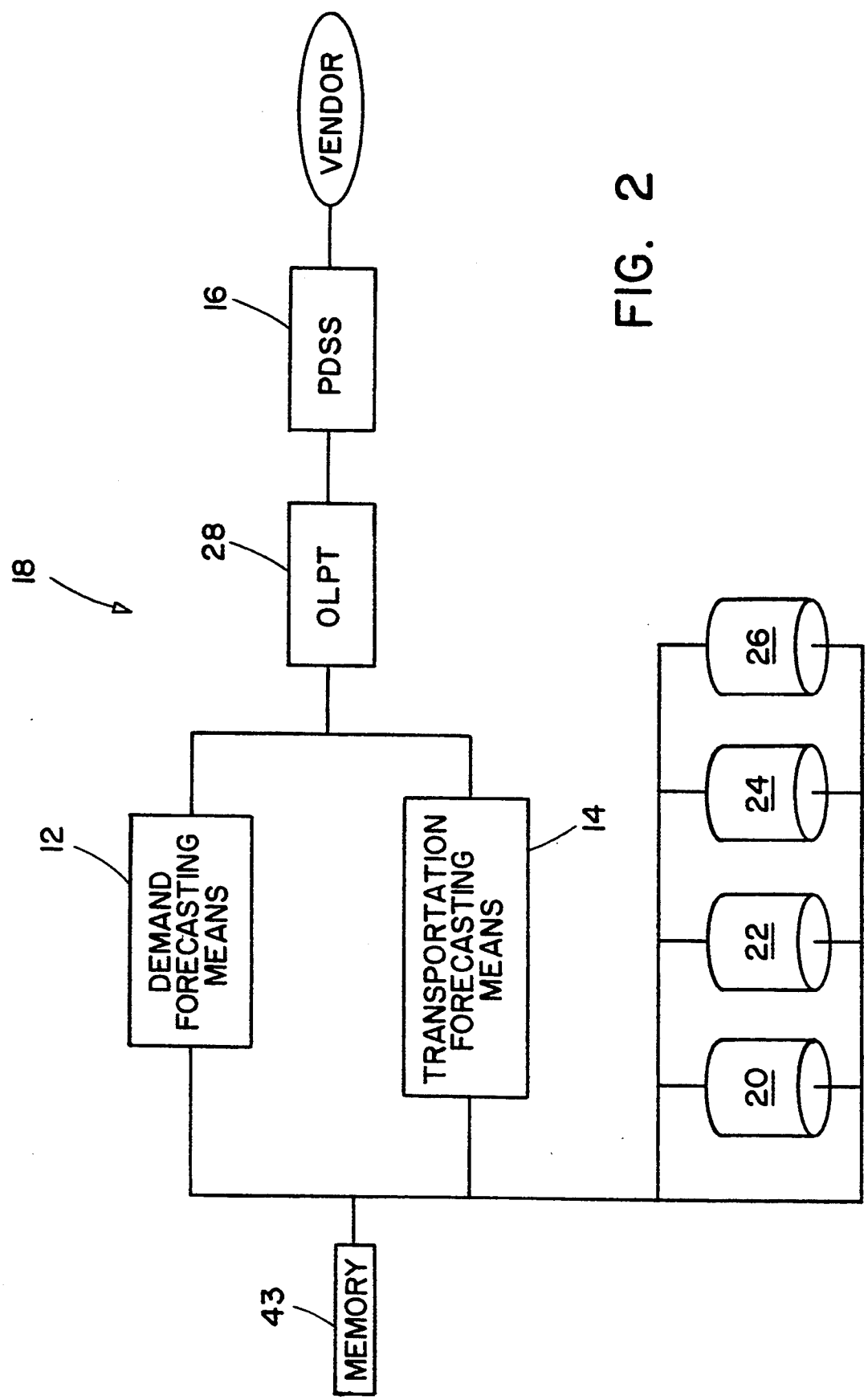
FIG. 2 is a block diagram of the method and system for Optimized Logistics Planning of the present invention.

With reference now to FIG. 2 of the drawings, there is provided a generalized block diagram of the system of the present invention which has been developed for use in cooperation with a computer having memory. The block diagram which is generally designated by reference numeral 18 is shown as incorporating demand and transportation forecasting means 12 and 14 such as the Advanced Material Management System (AMMS) referenced above and the Integrated Transportation Logistics System (INTRLOG) developed by Tadmis Worldwide. The system further incorporates item, customer, supplier and routing information databases 20, 22, 24 and 26, respectively. Still further, a vendor selection tool 16 is also provided such as the above referenced Procurement Decision Support System (PDSS) developed by Bellcore. Contrary to the prior art, however, the present invention further makes use of an additional logistics planning tool 28 which is capable of recommending optimal order quantities and timing, choice of vendor locations and storage locations and transportation modes. This optimal logistics planning tool 28 which has been designed to interface with the above-referenced databases 20, 22, 24 and 26 via, forecasting means 12 and 14 and vendor selection tool 16 has proven highly successful in minimizing inventory costs.

Operation

Figure 3A:
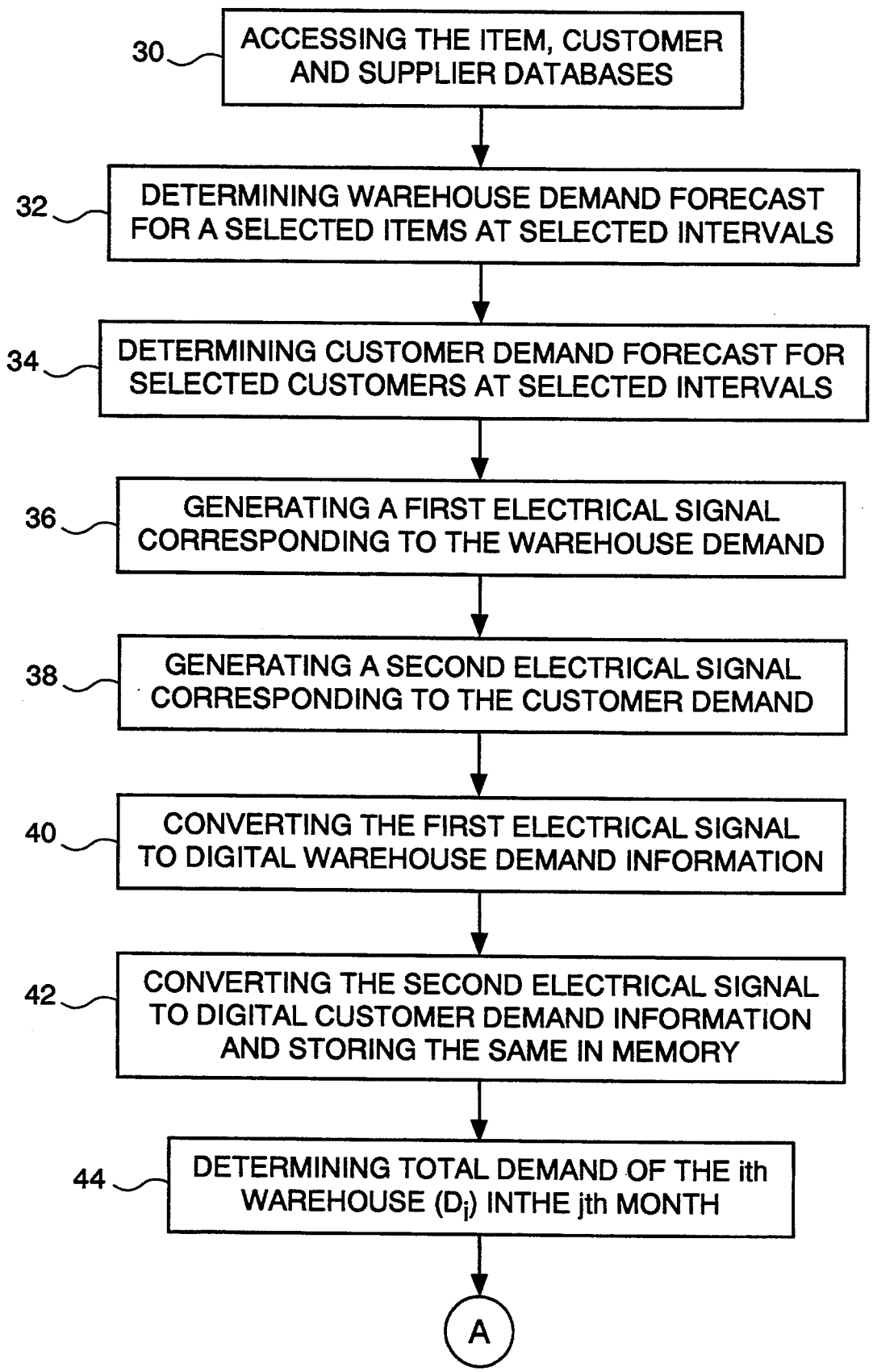
FIGS. 3a–3b are generalized flowcharts of the method steps of the present invention.
Figure 3B:
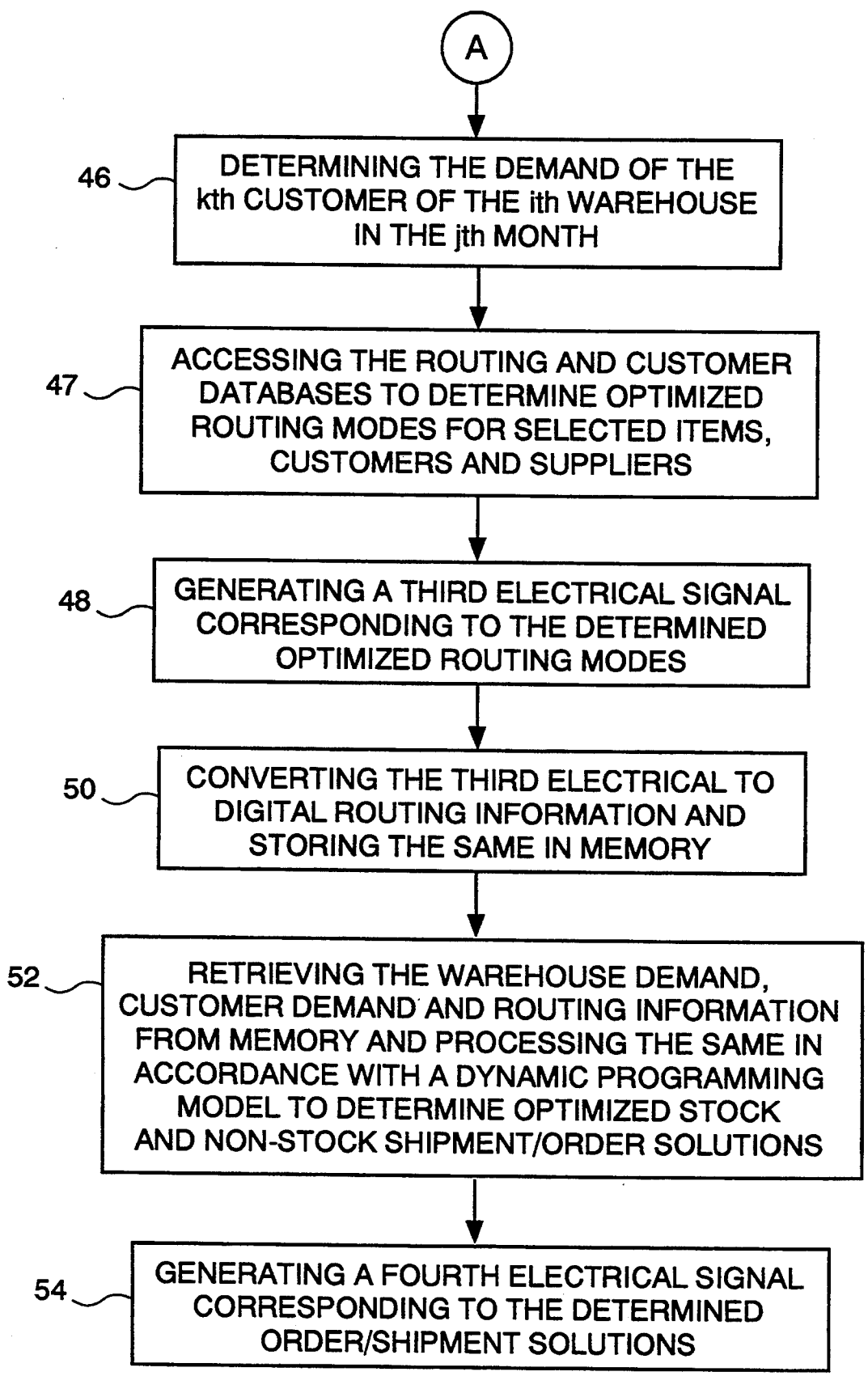

With reference to FIGS. 3a and 3b of the drawings, the method of operation of the present invention will now be described in further detail. As shown and referenced above, the optimized logistic planning tool of the present invention requires the initial accessing 30 of the item, customer and supplier databases 20, 22, and 24 the determination of warehouse and customer demand forecasts 32 and 34 for selected items, customers, and warehouses at selected intervals. Once determined, first and second electrical signals 36 and 38 corresponding to the warehouse demand and customer demand forecasts are generated which may thereafter be converted to digital warehouse and customer demand information 40 and 42 and stored in the computer memory 43 (not shown). In the preferred embodiment, the step of determining the warehouse and customer demand forecasts includes determining total demand of the ith warehouse ($D_i$) in the jth month 44; and determining the demand of the kth customer of the ith warehouse in the jth month in accordance with the mathematical models 46:

$$d_{ij} = \text{MAX}\left\{0, \frac{D_i * a_{ij} * (1 + j*t_i)}{1200}\right\},$$

$i = 1,2, \ldots W$
$j = 1,2, \ldots 12$ $d_{ij}{}^k = \overline{P}_i{}^k * d_{ij}$, $k = 1,2, \ldots, C_i$; $i = 1,2, \ldots, W$ and $j = 1,2, \ldots, 12$.

where,

W = the number of warehouses, $D_i$ = the total demand of the ith warehouse in the next 12 months, $t_i$ = the trend component, $C_i$ = the number of customers of the ith warehouse, $i = 1,2, \ldots, W$, $\overline{P}_i{}^k$ = the customer demand forecast percentage for the kth customer of the ith warehouse, and $a_{ij}$ = the demand index of the ith warehouse.

Once the customer and demand forecasts have been determined, the routing and customer databases may thereafter be accessed so that optimized routing modes may be determined for selected items, customers and suppliers 47. Thereafter, a third electrical signal may be generated 48 corresponding to the determined optimized routing modes which may be converted to digital routing information 50 and stored in the computer memory. Finally, the warehouse demand, customer demand and routing information may be retrieved from memory and processed 52 in order to determine optimized stock and non-stock shipment/order solutions in accordance with the dynamic programming model:

$$f(p) = \text{MIN}\left\{ f(j) + M_p(Q) + I_p(Q) + T(Q) \mid Q = \sum_{k=p}^{j-1} d_k, j = p+1, p+2, \ldots 13 \right\}$$

$$g(p) = j^*$$

where f(p) is the total cost function for the order quantity Q at the pth month and g(p) is the optimized order point;

where, j* is the index that minimizes the equation; and Q=order quantity at the pth month;
$M_p(Q)$=material cost;
$I_p(Q)$=inventory cost; and
$T(Q)$=transportation cost.

Significantly, the method and system of the present invention is capable of processing substantial input information as may be stored in the aforementioned item customer, supplier and routing information databases, 20, 22, 24 and 26, respectively, including Intercompany Costs, Item Classes, Intervals, Customer Information, Item Information, Supplier Information and Item-Supplier Information (by item). Examples of intercompany costs which are capable of being processed by the method and system of the present invention include warehouse location, warehouse zip code, contracting costs, purchasing costs, costs of capitol, inventory management costs and warehouse costs. Similarly, item class information which may be provided as input includes item class name, item class description, shrinkage, National Motor Freight Classification (NMFC), turn goal, service level goal, item class seasonality and item class repair history. Still further, interval information includes stock replenishment and repair interval information and customer stock order and non-stock order interval information. Still further, examples of customer information include customer zone, customer zip code, associated warehouse and mileage to the associated warehouse.

Item information includes item class, item number, item description, demand forecast, forecast type, dispersing unit and item dimension. Still further, supplier information includes supplier name, supplier location and supplier zip code. Finally, item-supplier input information includes item number, supplier name, supplier location, supplier unit price, supplier ARO and supplier MOQ. A more complete listing of the available input information which may be processed by the system and method of the present invention is provided below.

| Input | |
|---|---|
| 1. | Intercompany Costs |
| |   Warehouse Location |
| |   Warehouse Zip Code |
| |   Contracting Cost |
| |   Purchasing Cost |
| |   Cost of Capital |
| |   Inventory Management Cost |
| |   Warehouse Cost |
| |     Warehouse Demand Forecast Percentage |
| |     Line Items Shipped |
| |     Facilities - Interior |
| |     Facilities - Exterior |
| |     Return Handling |
| |     Repair Administration |
| |     Transship |
| 2. | Item Classes |
| |   Item Class Name |
| |   Item Class Description |
| |   Shrinkage |
| |   National Motor Freight Classification (NMFC) |
| |   Turn Goal |
| |   Service Level Goal |
| |   Item Class Seasonality |
| |     Demand Indices for Next 12 months |
| |     Coefficient of Variance |
| |     Trend Component |
| |   Item Class Repair History |
| |     Return Rate |
| |     Defective on Return |
| |     Keep Rate |
| |     Repairable |
| |     Test |
| |     Repair |
| |     NTF (No Trouble Found) |
| |     Like for Like |
| | Intervals |
| |   Customer Stock Replenishment Interval |
| |     Stock Maintainer Review |
| |     MR (Material Request) Generation |
| |     PO (Purchase Order) Generation |
| |     Transmit Purchase Order |
| |     Supplier ARO (After Receiving Order) |
| |     Supplier Transportation |
| |     Receive and Post |
| |     Put Away |
| |   Customer Stock Repair Interval |
| |     Stock Maintainer Review |
| |     MR Generation |
| |     PO Generation |
| |     Select and Pack Material |
| |     Transportation |
| |     Supplier ARO (After Receiving Order) |
| |     Supplier Transportation |
| |     Receive and Post |
| |     Put Away |
| |   Customer Stock Order Interval |
| |     Review Stock |
| |     Prepare Requisition |
| |     Transmit Requisition |
| |     Process Order |
| |     Select and Pack |
| |     Stage |
| |     Deliver |
| |     Receive and Post |
| |     Put Away |
| |   Customer Non-Stock order Interval |
| |     Review Stock |
| |     Prepare Requisition |
| |     Transmit Requisition |
| |     Process Purchase Order |
| |     Transmit Purchase Order |
| |     Supplier ARO (After Receiving Order) |
| |     Supplier Transportation |
| |     Receive and Post |
| |     Deliver |
| |     Put Away |
| 4. | Customer Information |
| |   Customer Zone |
| |   Customer Zip Code |
| |   Associated Warehouse |
| |   Mileage to the Associated Warehouse |
| |     Customer Demand Forecast Percentage |
| |     Number of Ship to Locations |
| |     Safety Stock Rounding |
| 5. | Item Information |
| |   Item Class |
| |   Item Number |
| |   Item Description |
| |   Demand Forecast |
| |   Forecast Type |
| |   Disbursing Unit |
| |   Item Dimension |
| |     Length |
| |     Width |
| |     Height |
| |     Weight |

-continued

| Input | |
|---|---|
| 6. | Supplier Information |
| | Supplier Name |
| | Supplier Location |
| | Supplier Zip Code |
| 7. | Item-Supplier Information (by Item) |
| | Item Number |
| | Supplier Name |
| | Supplier Location |
| | Supplier Unit Price |
| | Supplier ARO (After Receiving Order) |
| | Supplier MOQ (Minimum Order Quantity) |

Provided with this or a subset of this input information, a plurality of different types of solutions may be determined as output, including stock solutions, non-stock solutions, non-stock solutions through warehouse, mixed solutions, single supplier solutions and multiple supplier solutions.

Figure 4:
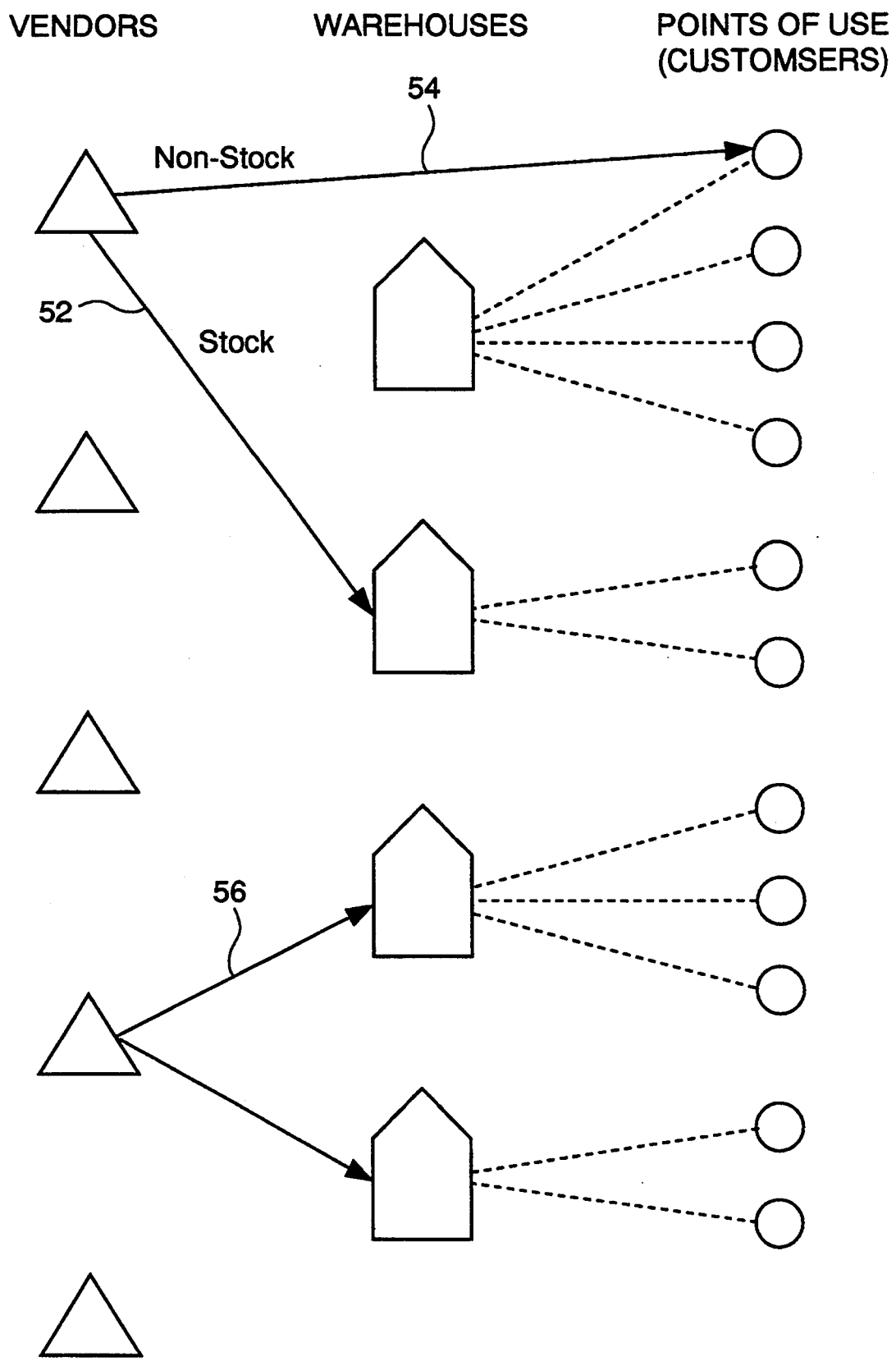
FIG. 4 is a schematic diagram of the routing options contemplated by the present invention.

As those skilled in the art will recognize, and as shown in FIG. 4, stock solutions are provided when items are shipped to warehouses, stored in the warehouses and later shipped to customers as designated by reference numeral 52. Similarly, non-stock solutions are provided when the item is shipped directly to customers as designated by reference numeral 54. Non-stock solutions through warehouse are provided when the selected item or items are shipped to warehouses (but not stored in warehouses), and then immediately shipped to customers as designated by reference numeral 56. Still further, mixed solutions are provided when a combination of stock and/or non-stock solutions are required for both direct and through warehouse shipment. Finally, single and multiple supplier solutions are developed when, depending on the total costs, different warehouse areas have different suppliers or, when a single supplier is sufficient.

Warehouse Demand Matrix

As referenced above, the interim warehouse demand matrix is used in the present invention to determine the stock solution where, D=Demand Forecast in input-/item information, W=the number of warehouses, and $P_i$=the warehouse demand forecast percentage in input/inter-company costs for the ith warehouse, i=1,2, . . . w. The total demand of the ith warehouse in the next 12 months ($D_i$) is thus equivalent to $P_i$ * D. It is thus necessary to convert $D_i$ to $d_{ij}$, the demand of the ith warehouse in the jth month, for i=1,2, . . . W and j=1,2, . . . 12. By further designating $a_{ij}$ as a demand index in the input/item class of the ith warehouse in the jth month, and $t_i$ as the trend component in input/item class for the ith warehouse, the matrix may be expressed as follows:

$$d_{ij} = \text{MAX}\left\{0, \frac{D_i * a_{ij} * (1 + j*t_i)}{1200}\right\},$$

$i = 1,2,\ldots W$
$j = 1,2,\ldots 12$

Customer Demand Matrix

As also referenced above, the customer demand matrix is used in the present invention to determine the non-stock solution and non-stock solutions through warehouse.

In the customer demand matrix, $C_i$ is designated as the number of customers of the ith warehouse, i=1,2, . . . W. By further designating $\overline{P}_i^k$ as the customer demand forecast percentage in the input/customer information for the kth customer of the ith warehouse, $D_{ij}^k$, the demand of the kth customer of the ith warehouse in the jth month may be defined as:

$$D_{ij}^k = P_i^k * d_{ij}$$

where k=1,2, . . . $C_i$, i=1,2, . . . W and j=1,2, . . . 12.

Using the above customer and warehouse demand matrices in the dynamic programming procedure referenced above, a number of different solutions may be solved for specified suppliers. More specifically, given any order quantity Q at the pth month, there will be three cost functions, material costs, $M_p(Q)$, inventory costs $I_p(Q)$ and transportation costs $T(Q)$. In accordance with the invention, the objective is to determine when to order and how much to order each time such that total costs will be minimized. More specific modeling steps which may be utilized by the present invention are described in further detail below.

Procedure SS (Single-Supplier/Stock): Procedure to find the optimal stock solution for a specified supplier.
1. Set i=1.
2. Let $d_j=d_{ij}$, j=1,2, . . . , 12, where $d_{ij}$'s are the warehouse demand matrix.
3. Use the dynamic programming procedure (DP) to find the optimal stock solution for the ith warehouse.
4. If i<W, then i=i+1 and go to Step 2. Otherwise, stop.

Procedure SNS (Single-Supplier/Non-Stock): Procedure to find the optimal non-stock solution for a specified supplier.
1. Set i=1 and k=1.
2. Let $\overline{d}_j^k=d_{ij}$, j=1,2, . . . , 12, where $d_{ij}^k$'s are the customer demand matrix.
3. Use the DP to find the optimal non-stock solution for the kth customer of the ith warehouse. Let $\overline{nf}_{ik}$ be the cost of this solution.
4. If k<C, then K=k+1 and go to Step 2.
5. Let $$nf_i = \Sigma_{k-1}^{C_i} nf_{ik}.$$

Then, $nf_i$ is the optimal non-stock solution cost for the ith warehouse.
6. If i<W, then i=i+1 and K=1, and go to Step 2. Otherwise, stop.

To find the non-stock solution through warehouse for a specified supplier, the tool uses the same order frequency and order quantities generated by the procedure SNS, but uses different cost functions $M_p(\cdot)$, $I_p(\cdot)$ and $T(\cdot)$ to recalculate the total costs.

Procedure SMS (Single Supplier/Mixed Solution): Procedure to find the optimal mixed solution for a specified supplier.
1. Set i=1 and k=1.
2. Let $d_j=d_{ij}$, j=1,2, . . . , 12, where $d_{ij}$'s are the warehouse demand matrix. Use the DP to find the optimal stock solution for the ith warehouse. Let $f_i$ be the cost of this solution.
3. Let $d_j=d_{ij}^k$, j=1,2, . . . , 12, where $d_{ij}^k$'s are the customer demand matrix. Use the DP to find the optimal non-stock solution for the kth customer of the ith warehouse. Let $\overline{nf}_{ij}$ be the cost of this solution.
4. If k<$C_i$, then k=k+1 and go to Step 2.

5. Let $$nf_i = \Sigma_{k=1}^{ci} nf_{ik}.$$

Then $nf_i$ is the optimal non-stock solution cost for the ith warehouse.

6. If $f_i \leq nf_i$, then the optimal stock solution is the best solution for the ith warehouse. Otherwise, the optimal non-stock solution is the best solution for the ith warehouse.

7. If $i<W$, then $i=i+1$ and $k=1$, and go to Step 2. Otherwise, stop.

If the user wants to find the best single supplier solution among the suppliers in the supplier-sublist determined in the Select Suppliers functional window, then the tool uses the following procedures, where S is the number of suppliers in the sublist:

Procedure BSS (Best Single Supplier/Stock): Procedure to find the best single supplier stock solution.

1. Let $l=1$.
2. Use the procedure SS to find the optimal stock solution for supplier 1. Let $f_l$ be the cost of this solution.
3. If $l<S$, then $l=l+1$ and go to Step 2.
4. Find $f_{lo} = \min \{f_l | l=1,2,\ldots,S\}$. Thus, supplier $l_o$ is the supplier for the best single supplier stock solution. Stop.

Procedures to find the best single supplier non-stock solution and the best single supplier mixed solution is similar to the procedure BSS by using procedures SNS and SMS, respectively.

For multiple supplier solutions, the tool uses the following procedures, where S is the number of suppliers in the sublist and W is the number of warehouses:

Procedure MS (Multiple Supplier/Stock): Procedure to find the optimal stock solution for multiple suppliers.

1. Let $i=1$ and $l=1$.
2. Use the DP to find the optimal stock solution of the ith warehouse for supplier 1 (it is similar as that of the procedure SS steps 2 and 3). Let $f_{il}$ be the cost of this solution.
3. If $l<S$, then $l=l+1$ and go to Step 2.
4. Find $f_{i,lo} = \min \{f_{il} | l=1,2,\ldots,S\}$. Thus, supplier $l_o$ is selected for the ith warehouse.
5. If $i<W$, then $i=i+1$ and $l=1$, and go to Step 2. Otherwise, stop.

Procedures to find the optimal non-stock solution (or mixed solution) for multiple suppliers is similar to the procedure MS.

Following the above processing steps, a plethora of output information may be obtained and displayed in one or more functional windows in cooperation with an appropriate user interface. A fourth electrical signal corresponding to the optimized solution or solutions may further be generated corresponding thereto. Typical output information which may be provided is listed below.

| Output | |
|---|---|
| 1. | Single Supplier Solutions |
| | Item Number |
| | Item Description |
| | Best Stock Solution |
| |   Supplier Name |
| |     Supplier Location |
| |     Total Cost |
| | Best Non-Stock Solution |
| |   Supplier Name |
| |     Supplier Location |
| |     Total Cost |

-continued

| Output | |
|---|---|
| | Best Mixed Solution |
| |   Supplier Name |
| |     Supplier Location |
| |     Total Cost |
| 2. | Single Supplier Stock Solution |
| | Item Number |
| | Item Description |
| | Supplier Name |
| | Supplier Location |
| | Total Quantity |
| | Total Shrinkage Quantity |
| | Turn Goal |
| | Projected Turn Rate |
| | Total Cost |
| |   Material Cost |
| |   Transportation Cost |
| |   Customer Cost |
| |   Capital Cost |
| |   Nonmaterial Total |
| |   Grand Total |
| | Unit Cost |
| |   Material Cost |
| |   Transportation Cost |
| |   Customer Cost |
| |   Capital Cost |
| |   Nonmaterial Total |
| |   Grand Total |
| | Detailed Report for Each Warehouse |
| |   Warehouse Location |
| |   When to Order |
| |   Order Quantity in Each Order |
| |   Transportation Mode in Each Order |
| |   Transportation Cost in Each Order |
| 3. | Single Suppler Non-Stock Solution |
| | Item Number |
| | Item Description |
| | Supplier Name |
| | Supplier Location |
| | Total Quantity |
| | Total Shrinkage Quantity |
| | Total Cost |
| |   Material Cost |
| |   Transportation Cost |
| |   Customer Cost |
| |   Capital Cost |
| |   Nonmaterial Total |
| |   Grand Total |
| | Unit Cost |
| |   Material Cost |
| |   Transportation Cost |
| |   Customer Cost |
| |   Capital Cost |
| |   Nonmaterial Total |
| |   Grand Total |
| | Detailed Report for Each Warehouse Area |
| |   Warehouse Location |
| |   When to Order |
| |   Order Quantity in Each Order |
| |   Transportation Mode in Each Order |
| |   Transportation Cost in Each Order |
| 4. | Single Supplier Non-Stock Solution Through Warehouse |
| | Item Number |
| | Item Description |
| | Supplier Name |
| | Supplier Location |
| | Total Quantity |
| | Total Shrinkage Quantity |
| | Total Cost |
| |   Material Cost |
| |   Transportation Cost |
| |   Customer Cost |
| |   Capital Cost |
| |   Nonmaterial Total |
| |   Grand Total |
| | Unit Cost |
| |   Material Cost |
| |   Transportation Cost |
| |   Customer Cost |
| |   Capital Cost |
| |   Nonmaterial Total |

-continued

| | Output |
|---|---|
| | Grand Total |
| | Detailed Report for Each Warehouse Area |
| |   Warehouse Location |
| |   When to Order |
| |   Order Quantity in Each Order |
| |   Transportation Mode in Each order |
| |   Transportation Cost in Each Order |
| 5. | Single Supplier Mixed Solution |
| |   Item Number |
| |   Item Description |
| |   Supplier Name |
| |   Supplier Location |
| |   Total Quantity |
| |   Total Shrinkage Quantity |
| |   Total Cost |
| |     Material Cost |
| |     Transportation Cost |
| |     Customer Cost |
| |     Capital Cost |
| |     Nonmaterial Total |
| |     Grand Total |
| |   Unit Cost |
| |     Material Cost |
| |     Transportation Cost |
| |     Customer Cost |
| |     Capital Cost |
| |     Nonmaterial Total |
| |     Grand Total |
| |   Solution Detail for Each Warehouse Area |
| |     Warehouse Location |
| |     Item Type |
| |     Quantity |
| |     Shrinkage Quantity |
| |     Turn Goal |
| |     Projected Turn Rate |
| |     Total Cost |
| |       Material Cost |
| |       Transportation Cost |
| |       Customer Cost |
| |       Capital Cost |
| |       Nonmaterial Total |
| |       Grand Total |
| |     Unit Cost |
| |       Material Cost |
| |       Transportation Cost |
| |       Customer Cost |
| |       Capital Cost |
| |       Nonmaterial Total |
| |       Grand Total |
| |   Detailed Report for Each Warehouse Area |
| |     Warehouse Location |
| |     Item Type |
| |     When to Order |
| |     Order Quantity in Each Order |
| |     Transportation Mode in Each Order |
| |     Transportation Cost in Each Order |
| 6. | Multiple Supplier Solutions |
| |   Item Number |
| |   Item Description |
| |   Best Stock Solution |
| |     Total Cost |
| |   Best Non-Stock Solution |
| |     Total Cost |
| |   Best Mixed Solution |
| |     Total Cost |
| 7. | Multiple Supplier Stock Solution |
| |   Item Number |
| |   Item Description |
| |   Warehouse Location |
| |   Supplier Name |
| |   Supplier Location |
| |   Total Quantity |
| |   Total Shrinkage Quantity |
| |   Turn Goal |
| |   Projected Turn Rate |
| |   Total Cost |
| |     Material Cost |
| |     Transportation Cost |
| |     Customer Cost |
| |     Capital Cost |
| |     Nonmaterial Total |

-continued

| | Output |
|---|---|
| |     Grand Total |
| |   Unit Cost |
| |     Material Cost |
| |     Transportation Cost |
| |     Customer Cost |
| |     Capital Cost |
| |     Nonmaterial Total |
| |     Grand Total |
| |   Detailed Report for Each Warehouse Area |
| |     Warehouse Location |
| |     Supplier Name |
| |     Supplier Location |
| |     When to Order |
| |     Order Quantity in Each Order |
| |     Transportation Mode in Each Order |
| |     Transportation Cost in Each Order |
| 8. | Multiple Supplier Non-Stock Solution |
| |   Item Number |
| |   Item Description |
| |   Warehouse Location |
| |   Supplier Name |
| |   Supplier Location |
| |   Total Quantity |
| |   Total Shrinkage Quantity |
| |   Total Cost |
| |     Material Cost |
| |     Transportation Cost |
| |     Customer Cost |
| |     Capital Cost |
| |     Nonmaterial Total |
| |     Grand Total |
| |   Unit Cost |
| |     Material Cost |
| |     Transportation Cost |
| |     Customer Cost |
| |     Capital Cost |
| |     Nonmaterial Total |
| |     Grand Total |
| |   Detailed Report for Each Warehouse Area |
| |     Warehouse Location |
| |     Supplier Name |
| |     Supplier Location |
| |     When to Order |
| |     Order Quantity in Each Order |
| |     Transportation Mode in Each Order |
| |     Transportation Cost in Each Order |
| 9. | Multiple Supplier Non-Stock Solution Through Warehouse |
| |   Item Number |
| |   Item Description |
| |   Warehouse Location |
| |   Supplier Name |
| |   Supplier Location |
| |   Total Quantity |
| |   Total Shrinkage Quantity |
| |   Total Cost |
| |     Material Cost |
| |     Transportation Cost |
| |     Customer Cost |
| |     Capital Cost |
| |     Nonmaterial Total |
| |     Grand Total |
| |   Unit Cost |
| |     Material Cost |
| |     Transportation Cost |
| |     Customer Cost |
| |     Capital Cost |
| |     Nonmaterial Total |
| |     Grand Total |
| |   Detailed Report for Each Warehouse Area |
| |     Warehouse Location |
| |     Supplier Name |
| |     Supplier Location |
| |     When to Order |
| |     Order Quantity in Each Order |
| |     Transportation Mode in Each Order |
| |     Transportation Cost in Each Order |
| 10. | Multiple Supplier Mixed Solution |
| |   Item Number |
| |   Item Description |
| |   Warehouse Location |

-continued

| Output |
|---|
| Supplier Name |
| Supplier Location |
| Total Quantity |
| Total Shrinkage Quantity |
| Turn Goal |
| Projected Turn Rate |
| Total Cost |
|    Material Cost |
|    Transportation Cost |
|    Customer Cost |
|    Capital Cost |
|    Nonmaterial Total |
|    Grand Total |
| Unit Cost |
|    Material Cost |
|    Transportation Cost |
|    Customer Cost |
|    Capital Cost |
|    Nonmaterial Total |
|    Grand Total |
| Detailed Report for Each Warehouse Area |
|    Warehouse Location |
|    Item Type |
|    Supplier Name |
|    Supplier Location |
|    When to Order |
|    Order Quantity in Each Order |
|    Transportation Mode in Each Order |
|    Transportation Cost in Each Order |

While the best modes for carrying out the invention have been described in detail, those familiar with the art to which this invention relates will recognize various alternative designs and embodiments for practicing the invention as defined by the following claims.

What is claimed is:

1. A computer system for optimized logistics planning, comprising:
   an item information database;
   a customer information database;
   a supplier information database;
   a routing information database;
   demand forecasting means for accessing said item, customer and supplier databases and determining warehouse and customer demand forecasts for selected items, customers and intervals;
   transportation forecasting means for accessing said routing and customer databases and determining optimized routing modes for selected items, customers, and suppliers;
   data processing means responsive to said demand forecasting means and said transportation forecasting means for determining stock and non-stock order/shipment solutions for said selected items and customers, including optimized supplier and routing selection, order timing and quantity;
   first signal generating means for generating a first electrical signal corresponding to said determined warehouse demand forecasts, said first signal generating means in electrical communication with said demand forecasting means;
   second signal generating means for generating a second electrical signal corresponding to said determined customer demand forecast, said second signal generating means in electrical communication with said demand forecasting means;
   first conversion means for converting said first and second electrical signals to digital warehouse and customer demand information;
   third signal generating means for generating a third electrical signal corresponding to said determined optimized routing modes, said third signal generating means in electrical communication with said transportation forecasting means;
   second conversion means for converting said third electrical signal to digital routing information;
   supplemental processing means in electrical communication with said first and second conversion means for processing said warehouse demand, customer demand, and routing information and determining said optimized stock and non-stock shipment/order solutions in accordance with the dynamic programming model:

$$f(p) = \text{MIN}\left\{ f(j) + M_p(Q) + I_p(Q) + T(Q) \,|\, Q = \sum_{k=p}^{j-1} d_{k,j} = p + 1, p + 2, \ldots 13 \right\}$$

$$g(p) = j^*$$

where f(p) is the total cost function for the order quantity Q at the pth month and g(p) is the optimized order point;
where j* is the index that minimizes the equation; and
Q = order quantity at the pth month;
$M_p(Q)$ = material cost;
$I_p(Q)$ = inventory cost; and
$T(Q)$ = transportation cost; and
means for
(a) ordering and shipping said selected items from said item information database, and
(b) routing said selected items to said selected customers, in accordance with said determined optimized stock and non-stock shipment/order solutions.

2. A computer system as in claim 1, further comprising a memory portion in electrical communication with said first and second conversion means for storing said digital warehouse information, said customer demand information and said digital routing information prior to processing.

3. A method implemented on a computer system for optimized logistics planning, comprising:
   providing an item information database;
   providing a customer information database;
   providing a supplier information database;
   providing a routing information database;
   accessing said item, customer and supplier databases and determining warehouse and customer demand forecasts for selected items, customers and warehouses at selected intervals by:
   (a) determining total demand of the ith warehouse ($D_i$) in the jth month; and
   (b) determining the demand of the kth customer of the ith warehouse in the jth month in accordance with the mathematical models:

$$d_{ij} = \text{MAX}\left\{ 0, \frac{D_i * a_{ij} * (1 + j * t_i)}{1200} \right\},$$

$i = 1, 2, \ldots W$
$j = 1, 2, \ldots 12$ $d_{ij}{}^k = P_i{}^k * d_{ij}$, k = 1, 1, . . . , $C_i$; i = 1, 2, . . . , W and j = 1, 2, ..., 12;
where,
W = the number of warehouses,
$D_i$ = the total demand of the ith warehouse in the next 12 months,
$t_i$ = the trend component,
$C_i$ = the number of customers of the ith warehouse, i = 1, 2, ..., W,
$P_i^k$ = the customer demand forecast percentage for the kth customer of the ith warehouse, and
$a_{ij}$ = the demand index of the ith warehouse;

accessing said routing and customer databases and determining optimized routing modes for selected items, customers and suppliers;

determining stock and non-stock order/shipment solutions for said selected items and customers, including optimized supplier and routing selection, order timing and quantity; and in accordance with said determined optimized stock and non-stock order/shipment solutions, (a) ordering and shipping said selected items from said item information database, and (b) routing said selected items to said selected customers.

4. A method implemented on a computer system for optimized logistics planning, comprising:

providing an item information database;
    providing a customer information database;
    providing a supplier information database;
    providing a routing information database;
    accessing said item, customer and supplier databases and determining warehouse and customer demand forecasts for selected items, customers and warehouses at selected intervals;

accessing said routing and customer databases and determining optimized routing modes for selected items, customers and suppliers;

determining stock and non-stock order/shipment solutions for said selected items and customers, including optimized supplier and routing selection, order timing and quantity;

generating a first electrical signal corresponding to said determined warehouse demand forecasts;

generating a second electrical signal corresponding to said determined customer demand forecast;

converting said first and second electrical signals to digital warehouse and customer demand information;

generating a third electrical signal corresponding to said determined optimized routing modes;

converting said third electrical signal to digital routing information;

processing said warehouse demand, customer demand and routing information and determining said optimized stock and non-stock shipment/order solutions in accordance with the dynamic programming model:

$$f(p) = \text{MIN}\left\{ f(j) + M_p(Q) + I_p(Q) + T(Q) \,\Big|\, Q = \sum_{k=p}^{j-1} d_{k,j} = p+1, p+2, \ldots 13 \right\}$$

$$g(p) = j^*$$

where f(p) is the total cost function for the order quantity Q at the pth month and g(p) is the optimized order point;
where $j^*$ is the index that minimizes the equation; and
Q = order quantity at the pth month;
$M_p(Q)$ = material cost;
$I_p(Q)$ = inventory cost; and
T(Q) = transportation cost; and in accordance with said determined optimized stock and non-stock shipment/order solutions, (a) ordering and shipping said selected items from said item information database, and (b) routing said selected items to said selected customers.

5. The method as in claim 4, further comprising providing a memory portion for storing said digital warehouse information, said customer demand information and said digital routing information prior to processing.

* * * * *